(12) United States Patent
Weiss et al.

(10) Patent No.: US 8,880,236 B2
(45) Date of Patent: Nov. 4, 2014

(54) STATIC SYNCHRONOUS GENERATORS

(75) Inventors: George Weiss, Rishon le Ziyon (IL); Qing-Chang Zhong, Liverpool (GB)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 466 days.

(21) Appl. No.: 13/128,540

(22) PCT Filed: Oct. 29, 2009

(86) PCT No.: PCT/GB2009/051460
§ 371 (c)(1),
(2), (4) Date: Jul. 25, 2011

(87) PCT Pub. No.: WO2010/055322
PCT Pub. Date: May 20, 2010

(65) Prior Publication Data
US 2011/0270463 A1 Nov. 3, 2011

(30) Foreign Application Priority Data
Nov. 12, 2008 (GB) ................................. 0820699.7

(51) Int. Cl.
| | | |
|---|---|---|
| *G05B 13/04* | (2006.01) | |
| *H02P 9/02* | (2006.01) | |
| *H02P 9/14* | (2006.01) | |
| *H02P 9/30* | (2006.01) | |
| *H02P 23/12* | (2006.01) | |
| *H02P 23/14* | (2006.01) | |
| *H02P 9/00* | (2006.01) | |

(52) U.S. Cl.
CPC .. *H02P 9/02* (2013.01); *H02P 9/14* (2013.01); *H02P 9/30* (2013.01); *H02P 23/12* (2013.01); *H02P 23/14* (2013.01); *H02P 2009/004* (2013.01)
USPC .......................................... 700/298; 700/297

(58) Field of Classification Search
USPC .......... 700/286, 287, 292, 297, 298; 703/2, 6, 703/7, 13, 18; 363/13, 40, 55, 106, 109
See application file for complete search history.

(56) References Cited

U.S. PATENT DOCUMENTS

| | | |
|---|---|---|
| 5,256,944 A | 10/1993 | Tobise et al. |
| 7,339,344 B2 | 3/2008 | Borisavljevic |

(Continued)

FOREIGN PATENT DOCUMENTS

| | | |
|---|---|---|
| CN | 1363989 | 8/2002 |
| CN | 1452807 | 10/2003 |

(Continued)

OTHER PUBLICATIONS

"Virtual Synchronous Machine", 9th International Conference on Electrical Power Quality and Utilisation of Oct. 9-11, 2007, by H.P. Beck and R. Hess.

(Continued)

*Primary Examiner* — Charles Kasenge
(74) *Attorney, Agent, or Firm* — Pearl Cohen Zedek Latzer Baratz LLP

(57) ABSTRACT

A method of controlling an inverter, by modelling a synchronous generator is provided. The method includes: representing angular position and rotational speed of virtual generator rotor using numerical variables; measuring the inverter's output current; calculating virtual electromagnetic torque acting on the virtual generator rotor from: measured inverter output current and variable representing virtual excitation current; calculating rotational speed of the virtual rotor from: virtual electromagnetic torque, variable representing virtual drive torque applied to the virtual generator rotor, and parameter representing the rotor's virtual inertia; calculating, from the variables representing angular position and rotational speed of virtual generator rotor, and excitation current, control signal for controlling the inverter to produce AC output which corresponds to that of the virtual synchronous generator; and implementing first feedback loop in which deviation of rotational speed of virtual generator rotor from a reference rotational speed is detected and used to adjust the virtual drive torque.

23 Claims, 8 Drawing Sheets

(56) References Cited

U.S. PATENT DOCUMENTS

| | | |
|---|---|---|
| 7,592,785 B2 | 9/2009 | Kimura et al. |
| 7,680,642 B2 * | 3/2010 | Hashimoto et al. ............ 703/14 |
| 7,881,814 B2 * | 2/2011 | Pearson et al. ................. 700/29 |
| 8,131,383 B2 * | 3/2012 | Pearson et al. ................. 700/29 |
| 2004/0056629 A1 * | 3/2004 | Maeda et al. ................. 318/719 |
| 2004/0150364 A1 * | 8/2004 | Netz et al. ..................... 318/721 |
| 2006/0155522 A1 * | 7/2006 | Hashimoto et al. ............ 703/15 |
| 2006/0268587 A1 | 11/2006 | Veenstra |
| 2007/0046246 A1 | 3/2007 | Borisavljevic |
| 2007/0069668 A1 * | 3/2007 | MacKay ...................... 318/254 |
| 2007/0069669 A1 * | 3/2007 | MacKay ...................... 318/254 |
| 2007/0069675 A1 * | 3/2007 | MacKay ...................... 318/439 |
| 2007/0069676 A1 * | 3/2007 | MacKay ...................... 318/439 |
| 2007/0069677 A1 * | 3/2007 | MacKay ...................... 318/439 |
| 2007/0164691 A1 * | 7/2007 | MacKay ........................... 318/1 |
| 2008/0116842 A1 | 5/2008 | Cheng et al. |
| 2008/0186000 A1 | 8/2008 | Kimura et al. |

FOREIGN PATENT DOCUMENTS

| | | |
|---|---|---|
| EP | 1758239 A2 | 2/2007 |
| FR | 2901647 A | 11/2007 |
| JP | 10122119 A | 5/1998 |
| JP | H10122119 | 5/1998 |
| WO | 2007066182 A1 | 6/2007 |
| WO | WO 2007/066182 | 6/2007 |

OTHER PUBLICATIONS

"Virtual Synchronous Generators", 2008, IEEE Power and Energy Society General—Conversion and Delivery of Electrical Energy in the 21th Century, pp. 1-3, by J. Driesen and J. Visscher.

Office Action of Chinese Patent Application No. 200980151605.8 dated May 6, 2013.

Office Action of European Patent Application No. 09756165.8 dated Dec. 20, 2013.

* cited by examiner (a) Regulation of real and reactive power (b) Provision of references, e.g., via PLL (a) whole period (b) start-up (c) after applying real power (a) the magnitude of the voltage (b) at steady state (a) frequency (b) real and reactive power (c) amplitude of the terminal voltage

STATIC SYNCHRONOUS GENERATORS

CROSS-REFERENCE TO RELATED APPLICATIONS

The present application is a National Phase Application of International Application No. PCT/GB2009/051460, filed Oct. 29, 2009, which claims priority to Great Britain Patent Application No. 0820699.7 filed Nov. 12, 2008, and which applications are incorporated herein fully by this reference.

The present invention is concerned with a control device for an inverter associated with an electrical power supply. Specifically, the control device causes the power supply and inverter together to mimic in some respects the behaviour of a synchronous electrical generator.

For economic, technical and environmental reasons, more and more distributed energy sources, such as combined heat and power (CHP) plants, and renewable energy sources, such as wind power, solar power, wave and tidal power etc, will play an important role in the future electricity supply. The EU has set a 22% target for the share of renewable energy sources and an 18% target for the share of CHP in electricity generation by 2010. The electrical power system is currently undergoing a dramatic change from centralised generation to distributed generation. Most of these distributed/renewable energy generators produce variable frequency AC sources, high frequency AC, or DC sources, and consequently require DC-AC converters to interface with the public grid. The term "inverter" will be used herein to refer to any device for converting DC to a controlled AC output. Wind turbines, for example, are most effective if free to generate at variable frequency and so they require conversion from variable frequency AC to DC to AC; small gas-turbines with direct drive generators operate at high frequency and require AC to DC to AC conversion; photo-voltaic arrays require DC-AC conversion. More and more inverters will be connected to the grid and will probably dominate the power generation eventually. In all of these cases the same basic inverters are used and need to be controlled to provide high-quality supply waveforms to consumers.

The current paradigm in the control of wind or solar power generators is to extract the maximum power from the power source and inject it all into the power grid. This is a good policy as long as such power sources constitute a negligible part of the grid power capacity, and power fluctuation of the renewable power generators can be compensated by the controllers associated with the grid's large conventional generators. Some of these generators will also take care of overall system stability and fault ride-through. When renewable power generators (especially the solar ones) provide the majority of the grid power, such "irresponsible" behaviour (on their part) will become untenable. Thus, the need will arise to operate them in the same way as conventional power generators function today. This requires first of all large and high efficiency energy storage units, so that the random fluctuations of the prime power source can be filtered out, but it also requires appropriate control of the outputs of the distributed energy sources. There are two options. One is to re-design the whole power system and to change the way it is operated. The other is to find a way for the inverters to be integrated into the existing system and behave in the same way as large synchronous generators (SG), which are the main generators in power plants of today. Apparently, the first option is not economically viable.

It has bees proposed that the inverters associated with distributed energy sources should be operated to mimic the behaviour of a synchronous generator (SG). The term "static synchronous generator (SSG)" has been defined by the Institute of Electrical and Electronic Engineers (IEEE) to represent a static, self-commutated switching power converter supplied from an appropriate electric energy source and operated to produce a set of adjustable multi-phase output voltages, which may be coupled to an AC power system for the purpose of exchanging independently controllable real and reactive power. This was originally defined for one of the shunt-connected controllers in FACTS (flexible AC transmission system). This term is borrowed here to represent inverters which behave like synchronous generators. An SSG has the characteristics of an SG but without rotating parts (hence static). In this way, distributed energy sources can be made to operate on principles well understood in connection with conventional synchronous generators.

A paper entitled "Virtual Synchronous Machine" given at the 9$^{th}$ International Conference on Electrical Power Quality and Utilisation of 9-11 Oct. 2007 by H. P. Beck and R. Hesse describes the basic concept of a virtual synchronous generator, as does the paper "Virtual Synchronous Generators" published in 2008 *IEEE Power and Energy Society General—Conversion a Delivery of Electrical Energy in the 21$^{st}$ Century*, pages 1-3, 2008 and written by J. Driesen and J. Visscher. Neither paper describes the practical details of a system required to control a static synchronous generator and this aspect remains problematic.

In accordance with a first aspect of the present invention there is a control device for an inverter, the control device implementing a model of a synchronous generator comprising variables representing the angular position and rotational speed of a virtual generator rotor, logic for calculating a virtual electromagnetic torque acting on the virtual generator rotor from measured inverter output current and from a variable representing a virtual excitation current, logic for calculating the rotational speed of the virtual rotor from the virtual electromagnetic torque and from at east one variable representing a virtual drive torque applied to the virtual generator rotor, and from a parameter representing the rotor's virtual inertia, and logic for calculating, from the variables representing angular position and rotational speed of the virtual generator rotor and from the variable representing the excitation current, a control signal for controlling the inverter to produce an AC output which corresponds to that of the virtual synchronous generator, the control device further comprising logic which implements a first feedback loop in which deviation of the rotational speed of the virtual generator rotor from a reference rotational speed is detected and used to adjust the virtual drive torque, thereby to regulate the angular speed of the virtual generator rotor, and hence to regulate frequency of the AC output from the inverter and the real power supplied by the inverter.

In accordance with a second aspect of the present invention, there is a method of controlling an inverter, comprising modelling of a synchronous generator by representing the angular position and rotational speed of a virtual generator rotor using numerical variables, measuring the inverter's output current, calculating a virtual electromagnetic torque acting on the virtual generator rotor from measured inverter output current and from a variable representing a virtual excitation current, calculating the rotational speed of the virtual rotor from the virtual electromagnetic torque and from at least one variable representing a virtual drive torque applied to the virtual generator rotor, and from a parameter representing the rotor's virtual inertia, and calculating, from the variables representing angular position and rotational speed of the virtual generator rotor and from the variable representing the excitation current, a control signal for controlling the inverter to produce an AC output which corresponds to that of the virtual synchronous generator, implementing a first feedback loop in which deviation of the rotational speed of the virtual generator rotor from a reference rotational speed is detected and us to adjust the virtual drive toque thereby to regulate the rotational speed of the virtual generator rotor and hence to regulate frequency of the AC output from the inverter and the real power supplied by the inverter.

Specific embodiments of the present invention will now be described, by way of example only, with reference to the accompanying drawings, in which:—

Figure 3:
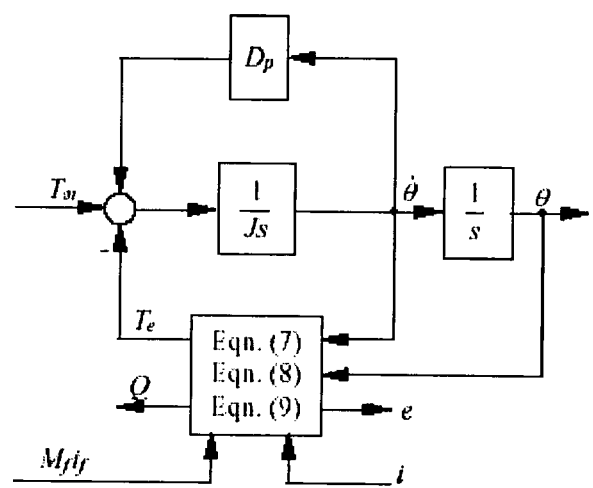
FIG. 3 is a block diagram representation of a virtual synchronous generator, without control logic.
Figure 4:
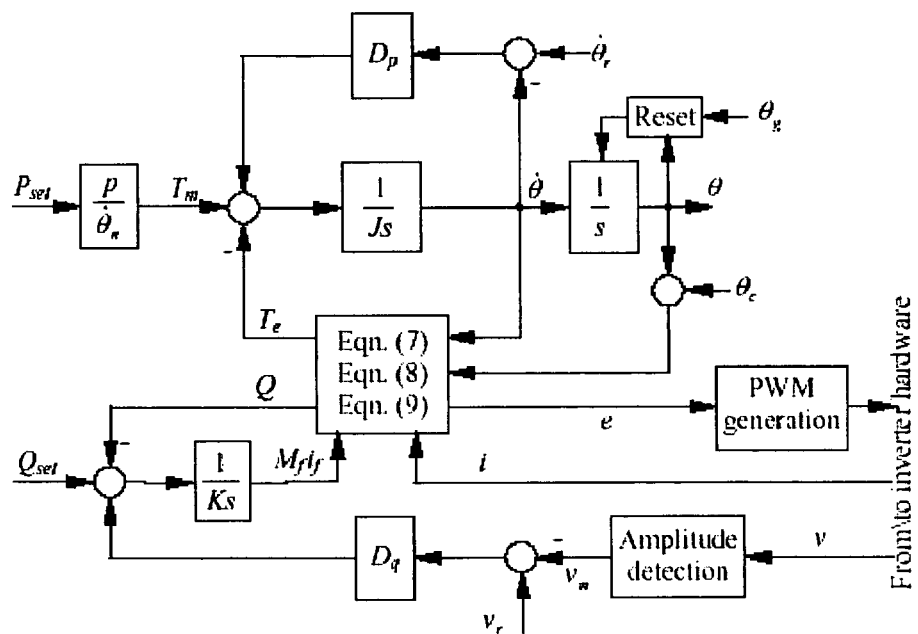
Figure 4:
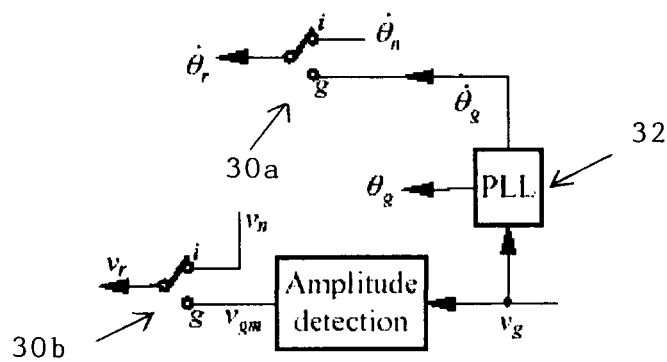
Figure 6A:
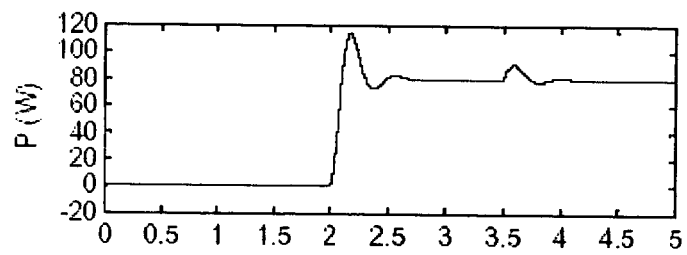
Figure 7:
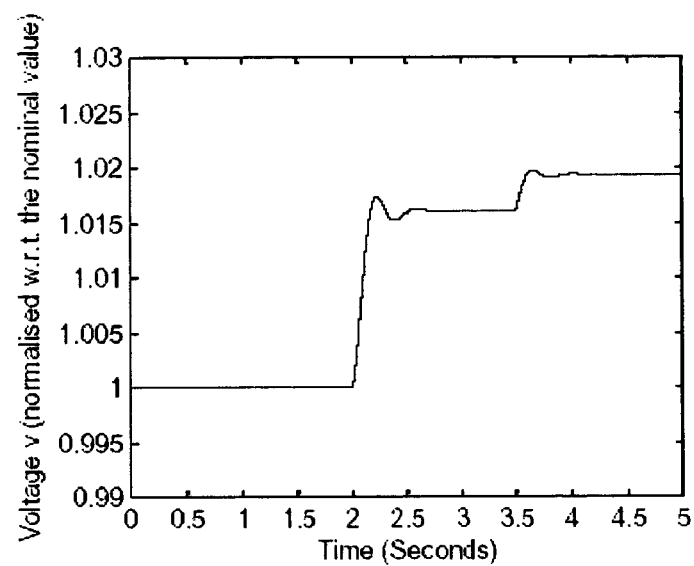
Figure 7:
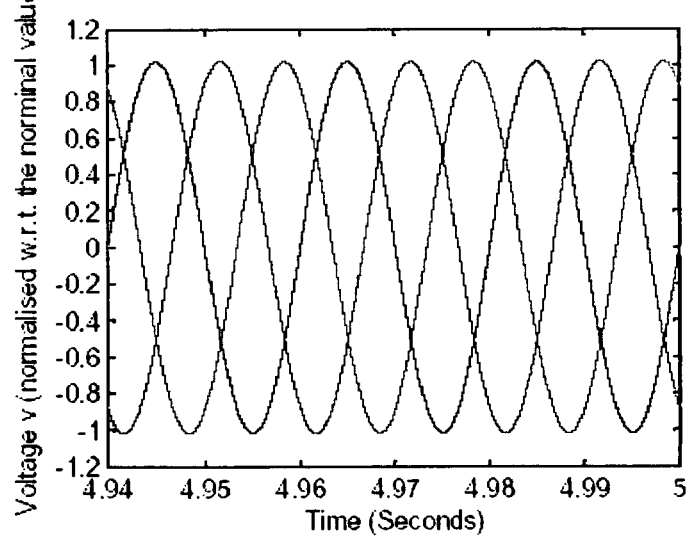
Figure 8:
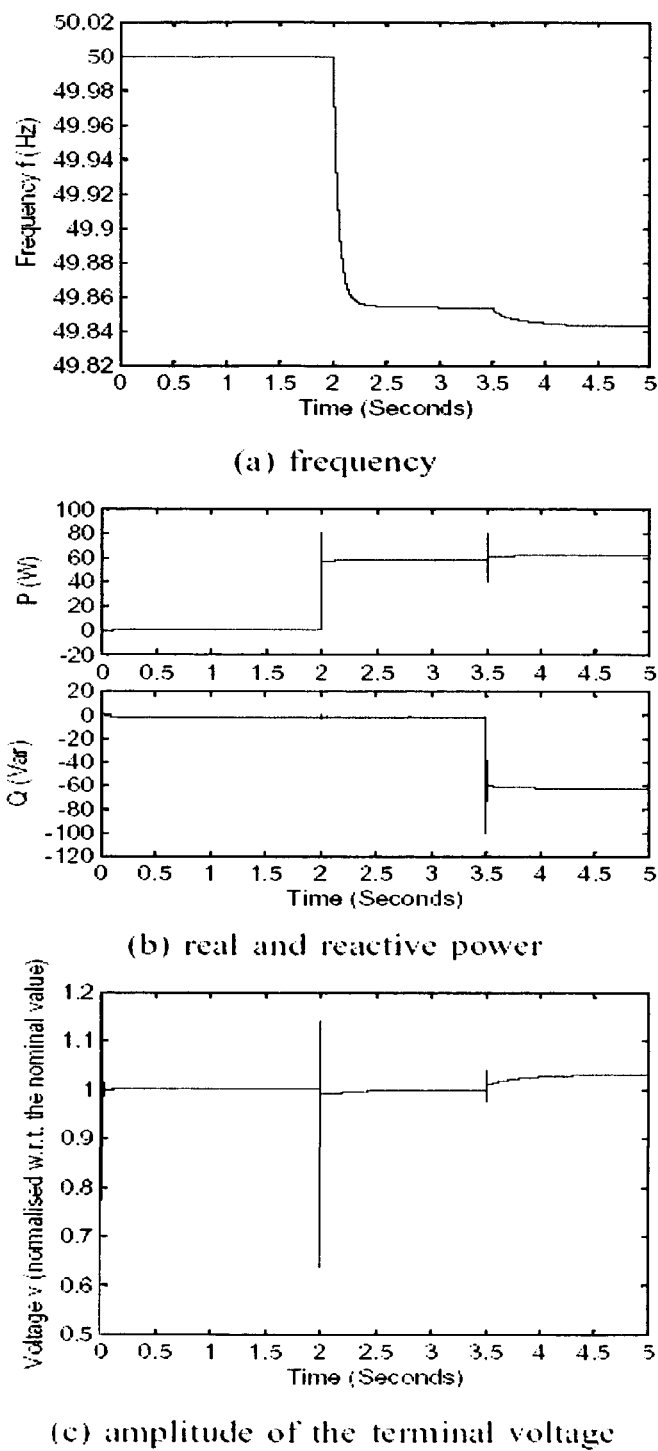

FIG. 4 corresponds to FIG. 3 but includes control logic;

FIGS. 5a to c are graphs of frequency variation over time in a simulation of an SSG according to the present invention;

FIGS. 6a and b are graphs of real and reactive power respectively in the simulation;

FIG. 7a shows variation of the amplitude of the terminal voltage of the SSG during simulation, and FIG. 7b shows, over a much briefer period of time, the sinusoidal variation of the three AC phases of the output from the SSG in a steady state; and FIGS. 8a to c are graphs of (a) frequency, (b) real and reactive power and (c) terminal voltage amplitude, all over time and all obtained in a second simulation of the SSG, this time in island mode.

The rest of this description is organised as follows. In Section I, a dynamic model of a synchronous generator is established under no assumptions on the signals. Although the model of an SG has been well described in the literature, the way the model is described here is somewhat fresh. Then, how to implement an inverter to mimic a synchronous generator is described in Section II and a system embodying the present invention for control of an SSG, incorporating frequency and voltage drooping mechanisms for load sharing, is described in Section III, followed by simulation results given in Section IV.

I. Modelling Synchronous Generators

Figure 1:
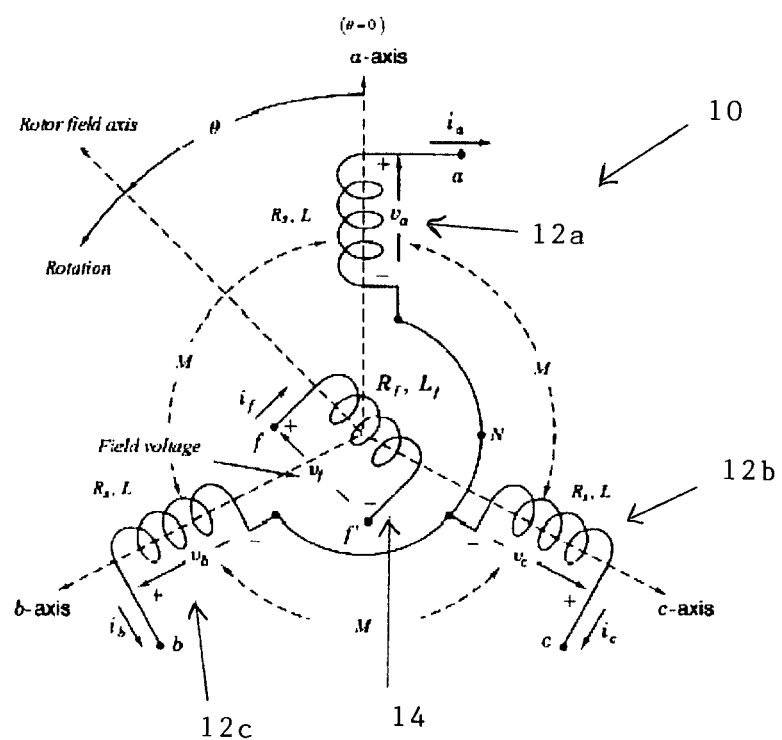
FIG. 1 represents the physical construction of an idealised three-phase round-rotor synchronous generator with a single pair of poles per phase.

The present embodiment of the invention is based on a mathematical model of a synchronous generator which is considered to be a dynamic system without any assumptions the signals. Consider the generator arrangement 10 seen in FIG. 1, which is a round rotor machine (without damping windings), with p pairs of poles per phase and no saturation effects in the iron core.

A. The Electrical Part

Three identical stator windings 12a-c are distributed in slots around the periphery of a uniform air gap. The stator windings can be regarded as concenrated coils having self-inductance L and mutual inductance −M (M>0 with a typical value ½L, the negative sign being due to the $$\frac{2\pi}{3}$$

phase angle). A field (or rotor) winding 14 can be regarded as a concentrated coil having self-inductance $L_f$. The mutual inductance between the field winding 14 and each of the three stator coils 12a-c varies with respect to the rotor angle θ as follows:

$$M_{af} = M_f \cos(\theta),$$

$$M_{bf} = M_f \cos\left(\theta - \frac{2\pi}{3}\right),$$

$$M_{cf} = M_f \cos\left(\theta - \frac{4\pi}{3}\right).$$

The flux linkages of the windings are $$\Phi_a = Li_a - Mi_b - Mi_c + M_{af}i_f$$

$$\Phi_b = -Mi_a + Li_b - Mi_c + M_{bf}i_f$$

$$\Phi_c = -Mi_a - Mi_b + Li_c + M_{cf}i_f$$

$$\Phi_f = M_{af}i_a + M_{bf}i_b + M_{cf}i_c + L_f i_f$$

where $i_a$, $i_b$ and $i_c$ are the stator phase currents and $i_f$ is the rotor excitation current, i.e. the current through the rotor winding 14. Denote $$\Phi = \begin{bmatrix} \Phi_a \\ \Phi_b \\ \Phi_c \end{bmatrix}, i = \begin{bmatrix} i_a \\ i_b \\ i_c \end{bmatrix}$$

and $$\widetilde{\cos}\theta = \begin{bmatrix} \cos\theta \\ \cos\left(\theta - \frac{2\pi}{3}\right) \\ \cos\left(\theta - \frac{4\pi}{3}\right) \end{bmatrix}; \widetilde{\sin}\theta = \begin{bmatrix} \sin\theta \\ \sin\left(\theta - \frac{2\pi}{3}\right) \\ \sin\left(\theta - \frac{4\pi}{3}\right) \end{bmatrix}.$$

Assume for the moment that the neutral line is not connected, then $$i_a + i_b + i_c = 0$$

The stator flux linkages can be rewritten as $$\Phi = L_s i M_f i_f \widetilde{\cos}\theta, \quad (1)$$

where $L_s = L + M$, and the field flux linkage can be rewritten $$\Phi_f = L_f i_f + M_f \langle i, \widetilde{\cos}\theta \rangle, \quad (2)$$

where $\langle , \rangle$ denotes the conventional inner product. The second term $M_f \langle i, \widetilde{\cos}\theta \rangle$ is constant if the three phase currents are sinusoidal and balanced. Assume that the resistance of the stator windings is $R_s$, then the phase terminal voltages $v = [v_a\ v_b\ v_c]^T$ can be obtained from (1) as $$v = -R_s i - \frac{d\Phi}{dt} = -R_s i - L_s \frac{di}{dt} + e, \quad (3)$$

Where $e = [e_a\ e_b\ e_c]^T$ is the back emf due to the rotor movement given by $$c = M_f i_f \dot{\theta} \widetilde{\sin}\theta - M_f \frac{di_f}{dt}\widetilde{\cos}\theta. \quad (4)$$

We mention that, from (2), the field terminal voltage $$v_f = R_f i_f + \frac{d\Phi_f}{dt}, \quad (5)$$

where $R_f$ is the resistance of the rotor winding. However, in the present treatment we shall not need the expression for $v_f$ because we shall use $i_f$, instead of $v_f$, as an adjustable constant input. In other embodiments it would be possible to regulate $v_f$ in place of $i_f$. This completes modelling the electrical part of the machine.

B. The Mechanical Part

The mechanical part of the machine is governed by $$J\ddot{\theta} = T_m - T_e + TD_p\dot{\theta}, \quad (6)$$

where J is the moment of inertia of all parts rotating with the rotor, $T_m$ is the mechanical torque upon the rotor due to the driver acting upon it (e.g. the engine driving a power station generator), $T_e$ is the electromagnetic torque on the rotor due to its interaction with the stators and $D_p$ is a damping factor. $T_e$ can be found from the total energy E stored in the machine, which is the sum of the magnetic energy stored in the stator and rotor magnetic fields and the kinetic energy stored in the rotating parts, i.e.

$$E = \frac{1}{2}\langle i, \Phi \rangle + \frac{1}{2}i_f\Phi_f + \frac{1}{2}J\dot{\theta}^2$$
$$= \frac{1}{2}\langle i, L_s i + M_f i_f \widetilde{\cos}\theta \rangle + \frac{1}{2}i_f(L_f i_f + M_f \langle i, \widetilde{\cos}\theta \rangle) + \frac{1}{2}J\dot{\theta}^2$$
$$= \frac{1}{2}\langle i, L_s i \rangle + M_f i_f \langle i, \widetilde{\cos}\theta \rangle + \frac{1}{2}L_f i_f^2 + \frac{1}{2}J\dot{\theta}^2.$$

Since the mechanical rotor position $\theta_m$ satisfies $\theta = p\theta_m$ we have $$T_e = -\frac{\partial E}{\partial \theta_m} \quad (7)$$
$$= -p\frac{\partial E}{\partial \theta}$$
$$= -pM_f i_f \langle i, \frac{\partial}{\partial \theta}\widetilde{\cos}\theta \rangle$$
$$= pM_f i_f \langle i, \widetilde{\sin}\theta \rangle.$$

Note that if $i = i_0 \widetilde{\sin}\phi$ (as would be the case in sinusoidal steady state), then $$T_e = pM_f i_f i_0 \langle \widetilde{\sin}\varphi, \widetilde{\sin}\theta \rangle = \frac{3}{2}pM_f i_f i_0 \cos(\theta - \varphi).$$

C. Provision of a Neutral Line

The above analysis is based on the condition that the neutral line is not connected. If the neutral line is connected, then the sum of the three line currents is not 0. Assume $$i_a + i_b + i_c = i_N$$

where $i_N$ is the current flowing through the neutral line. Then the formula for the stator flux linkages (1) becomes $$\Phi = L_s i + M_f i_f \widetilde{\cos}\theta - \begin{bmatrix}1\\1\\1\end{bmatrix} M i_N$$

and the phase terminal voltages (3) become $$v = -R_s i - L_s \frac{di}{dt} + \begin{bmatrix}1\\1\\1\end{bmatrix} M \frac{di_N}{dt} + e,$$

where e is given by (4). The other formulae are not affected.

It is important to note that, in a physical synchronous generator, the provision of a neutral line apparently complicates the system analysis. However, in an SSG to be designed in the next section, M is a design parameter and can hence be chosen as 0. The physical meaning of this is that the mutual inductance M between stator windings is 0. In other words, there is no magnetic coupling between stator windings. This does not happen in a physical synchronous generator but can be easily implemented in an SSG. In the rest of this paper, M is chosen as 0 and the model of a synchronous generator, consisting of equations (3), (4), (5), 6) and (7), will be used to operate an inverter.

II. Implementation of a Static Synchronous Generator

Figure 2:
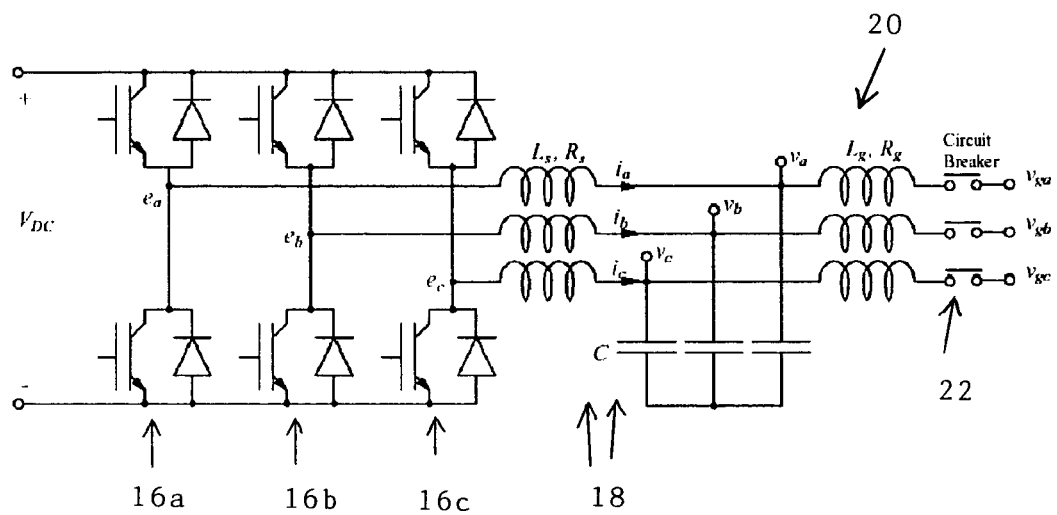
FIG. 2 is a circuit diagram of an inverter for use in implementing the present invention.

In this section, the details of how to implement an inverter as a static synchronous generator will be described. A simple DC/AC converter (inverter) used to convert the DC power supply $V_{DC}$ obtained from renewable/distributed energy sources into three-phase AC ($v_a$, $v_b$, $v_c$) is shown in FIG. 2. It consists of three phase legs 16a-c and a three-phase LC filter 18 which is used to suppress the switching noise. If the inverter is to be connected to the grid then a three-phase coupling inductor 20 and a circuit breaker 22 are needed to interface with the grid. The filtering capacitors C should be chosen such that the resonant frequency $$\frac{1}{\sqrt{L_s C}}$$

is approximately $\sqrt{\omega_n \omega_s}$ where $\omega_n$ is the nominal angular frequency of the voltage and $\omega_s$ is the angular switching frequency used to turn on/off inverter switches in the phase legs 16a-c (insulated gate bipolar transistors 22 are shown in the figure but other types of switch could be substituted).

An SSG can be implemented according to the mathematical model developed in the previous section. As explained in detail later in this section, an SSG consists of a power part, i.e., the inverter shown in FIG. 2, and an electronic part shown in FIG. 3. These two parts are interfaced via the signals e and i (and v and $v_g$ to be used for regulating purposes).

A. The Electronic Part

It is advantageous (but not essential) to assume that the field (rotor) winding is fed by an adjustable DC current source $i_f$ instead of a voltage source $v_f$. In this case, the terminal voltage $v_f$ varies, but this is irrelevant. As long as $i_f$ is constant, the generated voltage of the virtual genera or from (4) is $$e = \dot{\theta} M_f i_f \widetilde{\sin}\theta. \quad (8)$$

Define the generated real power P reactive power Q as $$P=\langle i,e\rangle \text{ and } Q=\langle i,e_q\rangle,$$

where $e_q$ has the same amplitude as e but with a phase delayed from that of e by $$\frac{\pi}{2},$$

i.e., $$e_q = \dot{\theta} M_f i_f \sin\left(\theta - \frac{\pi}{2}\right) = -\dot{\theta} M_f i_f \cos\theta.$$

Then, the real power and reactive power are, respectively, $$P = \dot{\theta} M_f i_f \langle i, \sin\theta\rangle,$$

$$Q = -\dot{\theta} M_f i_f \langle i, \cos\theta\rangle. \quad (9)$$

Note that if $i = i_0 \sin\phi$ (as would be the case in the sinusoidal steady state), then $$P = \dot{\theta} M_f i_f \langle i, \sin\theta\rangle = \frac{3}{2}\dot{\theta} M_f i_f i_0 \cos(\theta - \varphi),$$

$$Q = -\dot{\theta} M_f i_f \langle i, \cos\theta\rangle = \frac{3}{2}\dot{\theta} M_f i_f i_0 \sin(\theta - \varphi).$$

These coincide with the conventional definitions for real power and reactive power (note that the coefficient 3 is because there are three phases). When the voltage and current are in phase, i.e. when $\theta - \phi = 0$, the product of the rms values of the voltage and current gives the real power P. When the voltage and current are $$\frac{\pi}{2}$$

out of phase, this product gives reactive power Q. Moreover, inductors absorb reactive power with a positive Q (since $$\theta - \varphi = \frac{\pi}{2},$$

i.e. the voltage leads the current by $$\frac{\pi}{2})$$

while capacitors generate reactive power with a negative Q (since $$\theta - \varphi = -\frac{\pi}{2},$$

i.e. the voltage lags the current by $$\frac{\pi}{2}.$$

The above two formulae about P and Q are very important when regulating the real and reactive power of a SG. However, it seems that the formula for reactive power has not been well documented in the literature and the reactive power has not been regarded as an important part of the SG model.

Equation (6) can be written as $$\ddot{\theta} = \frac{D_p}{J}\dot{\theta} + \frac{1}{J}(T_m - T_e),$$

where the input is the mechanical torque $T_m$, while the electromagnetic torque $T_e$ depends on i and $\theta$, according to (7). This equation, together with (7), (8) and (9), are implemented in the electronic part of an SSG shown in FIG. 3. Thus, the state variables of the SSG are i (which are actual currents), $\theta$ and $\dot{\theta}$ (which are a virtual angle and a virtual angular speed). The control inputs of the SSG are $T_m$ and $M_f i_f$. In order to operate the SSG in a useful way, we need a controller that generates the signals $T_m$ and $M_f i_f$ such that system stability is maintained and the desired values of real and reactive power are followed. The significance of Q will be discussed in the next section.

B. The Power Part

The terminal voltages $v = [v_a \ v_b \ v_c]^T$ given in (3) can be obtained from the (local load) terminals $v_a$, $v_b$ and $v_c$ of the inverter shown in FIG. 2. The inductance $L_s$ and resistance $R_s$ of the inductor can be chosen to represent the stator impedance of a synchronous generator. The switches in the inverter are operated so that the average values of $e_a$, $e_b$ and $e_c$ over a switching period should be equal to e given in (8) and, hence no special pulse-width-modulation (PWM) techniques are necessary. Also shown in FIG. 2 is a three-phase interfacing inductor $L_g/R_g$ and a circuit breaker to facilitate synchronisation/connection with the grid.

III. Operation of an SSG

A. Frequency Drooping and Regulation of Real Power

The terms "real" and "reactive" power are very well known in relation to AC power transmission. The power flow resulting in net transfer of energy, over a complete AC cycle, is the real power. The power flow due to energy which is stored and returned to the source over a cycle (by virtue of capacitance, inductance or equivalent) is the reactive power.

For synchronous generators, the rotor speed is maintained by the prime mover and it is known that the damping factor $D_p$ is due to mechanical friction etc. In a real SG frequency tends to droop (fall) according to the real power delivered. This is important in the existing power distribution grid as it results in SGs sharing load. When the real power demand increases, the speed of the prime mover drops. The speed regulation system of the prime mover then increases the mechanical power, e.g. widening the throttle valve of an engine, so that a new power balance is achieved. This mechanism can be implemented by comparing the virtual angular speed $\dot{\theta}$ e.g. with an angular frequency reference $\dot{\theta}_r$, e.g. the nominal angular speed $\dot{\theta}_n$, before feeding it into the damping block $D_p$—see the upper part of FIG. 4(a). As a result, the damping factor $D_p$ actually behaves as a frequency drooping coefficient, which is defined as the ratio of the required change of torque $\Delta T$ to the change of speed (frequency) $\Delta \dot{\theta}$. That is $$D_p = \frac{\Delta T}{\Delta \dot\theta} = \frac{\Delta T}{T_{mn}} \frac{\dot\theta_n}{\Delta \dot\theta} \frac{T_{mn}}{\dot\theta_n};$$

where $T_{mn}$ is the nominal mechanical torque. Note that in much of the literature, $D_p$ is defined as $$\frac{\Delta \dot\theta}{\Delta T}.$$

The mechanical torque $T_m$ can be obtained from a set point of real power $P_{set}$ after dividing by the nominal mechanical speed $$\frac{\dot\theta_n}{p}.$$

This completes the feedback loop for real power; see the upper part of FIG. 4(a). Because of the built-in frequency drooping mechanism, an SSG automatically shares the load with other inverters of the same type connected on the same bus. The power regulation loop is very simple because no mechanical devices are involved and no measurements are needed for real power regulation (all variables are available internally).

The regulation mechanism of the real power (toque) shown in the upper part of FIG. 4(a) has a cascaded control structure, of which the inner loop is the frequency loop and the outer loop is the real power (torque) loop. The time constant of the frequency loop is $$\tau_f = \frac{J}{D_p}.$$

In other words, J an be chosen as $$J = D_p \tau_f.$$

Because there is no delay involved in the frequency drooping loop, the time constant $\tau_f$ can be made much smaller than that of a physical synchronous generator. In order to make sure that the frequency loop has a quick response so that it can track the frequency reference quickly, $\tau_f$ should be made small. Hence, for a given frequency drooping coefficient $D_p$, J should be made small. This indicates that it is not necessary to have a large inertia for the virtual physical synchronous generator, although a larger inertia means that more energy can be stored. In other words, the energy storage function of an SSG can, and should, be decoupled from the inertia.

B. Voltage Drooping and Regulation of Reactive Power

The regulation of reactive power Q flowing out of the SSG can be realised similarly. Define the voltage drooping coefficient $D_p$ as the ratio of the required change of reactive power $\Delta Q$ to the change of voltage $\Delta v$, i.e.

$$D_q = \frac{\Delta Q}{\Delta v} = \frac{\Delta Q}{Q_n} \frac{v_n}{\Delta v} \frac{Q_n}{v_n};$$

where $Q_n$ is the nominal reactive power, which can be chosen as the nominal power, and $v_n$ is the nominal amplitude of terminal voltage v. The regulation mechanism for the reactive power can be realised as shown in the lower part of FIG. 4(a). The difference between the voltage reference $v_r$, e.g. the amplitude $v_n$ of the nominal voltage, and the amplitude $v_m$ of the actual terminal voltage v is amplified by the voltage drooping coefficient $D_q$ before adding to the difference between the set point $Q_{set}$ and the current reactive power Q, which is calculated according to (9). The resulting signal is then fed into an integrator with a gain 1/K to generate $M_f i_f$ (here, K is dual to the inertia J). It is important to note that there is no need to measure reactive power Q as it is available internally.

The regulation mechanism of the reactive power shown in the lower part of FIG. 4(a) has a cascaded control structure, if the effect of the LC filter 18 is ignored or compensated (which means v=e). The inner loop is the (amplitude) voltage loop and the outer loop is the reactive power loop. The time constant of the voltage loop is $$\tau_v = \frac{K}{\dot\theta D_q} \approx \frac{K}{\dot\theta_n D_q}$$

as the variation of $\dot\theta$ is very small. Hence, K can be chosen as $$K = \dot\theta_n D_q \tau_v.$$

The amplitude $v_m$ of the terminal voltage v can be obtained as follows. Assume that $v_a = v_{am} \sin\theta_a$, $v_b = v_{bm} \sin\theta_b$ and $v_c = v_{cm} \sin\theta_c$, then $$v_a v_b + v_b v_c + v_c v_a = v_{am} v_{bm} \sin\theta_a \sin\theta_b + v_{bm} v_{cm} \sin\theta_b \sin\theta_c +$$

$$v_{cm} v_{am} \sin\theta_c \sin\theta_a$$

$$= \frac{v_{am} v_{bm}}{2} \cos(\theta_a - \theta_b) + \frac{v_{bm} v_{cm}}{2} \cos(\theta_b - \theta_c) +$$

$$\frac{v_{cm} v_{am}}{2} \cos(\theta_c - \theta_a) - \frac{v_{am} v_{bm}}{2} \cos(\theta_a - \theta_b) -$$

$$\frac{v_{bm} v_{cm}}{2} \cos(\theta_b - \theta_c) - \frac{v_{cm} v_{am}}{2} \cos(\theta_c - \theta_a).$$

When the terminal voltages are balanced, i.e., when $v_{am} = v_{bm} = v_{cm} = v_m$ and $$\theta_b = \theta_a - \frac{2\pi}{3} = \theta_c + \frac{2\pi}{3},$$

then the last three terms in the above equality are balanced, having a doubled frequency. Hence, $$v_a v_b + v_b v_c + v_c v_a = -\frac{3}{4} v_m^2,$$

and the amplitude $v_m$ of the actual terminal voltage v can be obtained as $$v_m = \frac{2}{\sqrt{3}} \sqrt{-(v_a v_b + v_b v_c + v_c v_a)}. \quad (10)$$

In real implementation, a low-pass filter is needed to filter out the ripples at the doubled frequency as the terminal voltages may be unbalanced. This also applies to $T_e$ and Q.

C Operation Modes of an SSG and its Synchronisation

As shown above, an SSG can be operated in the same way as a synchronous generator under normal working conditions. An important process related to an SSG or SG is the synchronisaton procedure prior to connection of the SSG/SG to another SSG/SG or to the public grid. This procedure involves bringing the terminal voltage v to be (almost) the same as the grid voltage $v_g$ on the other side of the circuit breaker 22, which means the same amplitude, the same frequency and the same phase angle. It is not an easy task to implement this for conventional SGs as this procedure involves much external equipment. For the SSG developed in this paper, this is relatively easy variables required are all available internally. A change of operation mode from island mode (in which the SSG operates without connection to a power grid) to grid-connected mode or vice verse can be implemented via a controlled multi-pole-double-throw (MPDT) switch 30a, b, FIG. 4, with one throw for island mode (labelled as i) and the other for grid-connected mode (labelled as g), to change the frequency/voltage references. Whether an SSG works in island mode or grid-connected mode, the status of the MPDT switch 30a, b, is determined by the presence of the grid voltage and the status of a mode switch which sets the operation mode of the SSG. See Table 1 for the logic of operation. The default position of the mode switch is at "grid-connected" and it is turned to "island" when there is a fault. In grid-connected mode, the frequency/voltage references are set as the corresponding values of the grid voltage $v_g$ and the integrator that produces phase θ, the electrical angle between the rotor field and the phase-a field, is reset according to the grid phase when the circuit breaker is not turned on. There are many ways to obtain the grid frequency $\dot{\theta}_g$ and phase $\theta_g$; one of them is to use a phase-locked loop (PLL), as shown at 32 in FIG. 4. The amplitude $v_{gm}$ of the voltage $v_g$ on the grid side of the circuit breaker can be calculated according to (10), replacing v with $v_g$. In island mode, the references are set to the corresponding nominal values $$\dot{\theta}_r = \dot{\theta}_n, v_r = v_n.$$

When the voltage across the circuit breaker is small, the SSG can provide a green (go-ahead) signal for the operator to turn on the circuit breaker (it can be set to turn on automatically). The circuit breaker is allowed to be turned on in two cases: (1) when the MPDT switch i_g is set at Throw g, i.e., when the grid voltage is present and the mode switch is tuned at grid-connected mode; (2) when the grid voltage is not present and the mode switch is turned at island mode, which allows parallel operation of multiple inverters (to be discussed in more detail later).

After the circuit breaker is turned on, as the amplitude of the terminal voltage is set to follow that of the grid voltage, the voltage drooping mechanism disappears and the terminal voltage amplitude is determined by the grid. The frequency also

TABLE 1

THE LOGIC OF OPERATION FOR AN SSG (TRUTH TABLE)

| Inputs | | | Outputs |
|---|---|---|---|
| Presence of $v_g$ | Mode switch | MPDT i_g | Circuit breaker to be turned on |
| Yes | island | i | Prohibited |
| Yes | grid-connected | g | Allowed after synchronisation |

TABLE 1-continued

THE LOGIC OF OPERATION FOR AN SSG (TRUTH TABLE)

| Inputs | | | Outputs |
|---|---|---|---|
| Presence of $v_g$ | Mode switch | MPDT i_g | Circuit breaker to be turned on |
| No | island | i | Allowed without synchronisation |
| No | grid-connected | i | Prohibited | follows that of the grid. The integrator that produces phase θ is no longer reset according to the grid phase and hence real power can be regulated. Multiple SSGs can be connected to the grid in the same way. Because of the presence of a grid, $P_{set}$ and $Q_{set}$ should be set at the values requested by the grid operator. In this case, local load can be connected to the inverter terminals $v_a$, $v_b$ and $v_c$ to form a micro grid. In order for the frequency and the voltage to follow hose of the grid, it is important to choose small $\tau_f$ and $\tau_v$.

If there is no grid voltage present, then an SSG works in island mode and the real power and reactive power delivered by the SSG are determined by the load. If there is more than one SSG to be connected in parallel, then the first one that is put into operation works with the mode switch set at "island" to establish the system frequency and voltage. Note that in this case the circuit breaker can be turned on straightaway, according to the logic of operation set in Table 1, so that the voltage is present on the other side of the circuit breaker, which allows other SSGs to synchronise with it and to join the system under the grid-connected mode. In this case, $P_{set}$ and $Q_{set}$ should be set at 0 as the power delivered is determined by the local load.

D. Some Practical Issues

It is necessary to measure the terminal voltage v for the voltage drooping, the current i flowing out of the inverter for the calculation of $T_e$, P and Q the grid voltage $v_g$ for synchronisation. A complete SSG consists of a power part shown in FIG. 2, and a complete electronic part shown in FIGS. 4(a) and (b), which are interfaced with each other via $\dot{\theta}_r$, $\theta_g$ and $v_r$. It can be seen that the nominal angular frequency $\dot{\theta}_n$ and voltage (amplitude) $v_n$ are all set in the system via the frequency reference $\dot{\theta}_r$ and voltage reference $v_r$. A resetting mechanism is added to the integrator generating θ to prevent numerical overflow under normal working condition and to obtain the same phase as the grid voltage during synchronisation. The phase of the SSG can be reset as 0 when the grid voltage crosses 0, which is impossible for a physical synchronous generator. Another important mechanism is to add a constant phase shift $\theta_c$ to the phase θ so that the delay in the PWM switching process and the phase shift of the LC filter can be compensated, which brings the phase difference between v and $v_g$ to be minimal during synchronisation. The electronic part of an SSG can be implemented in a microcontroller (this is normally the case) and, hence, it is possible to use different values of $D_p(D_q)$ and J(K) when the SSG works in different modes.

Some guidelines on choosing $D_p$ and J are: (1) $D_p$ should be chosen to satisfy the frequency regulation requirement; (2) J should be chosen to achieve the desired frequency-loop time constant $\tau_f$.

Some guidelines on choosing $D_q$ and K are: (1) $D_q$ should be chosen to satisfy the voltage regulation requirement; (2) K should be chosen to achieve the desired voltage-loop time constant $\tau_v$.

For relatively small inverters, $D_p$ and ($D_q$) should be chosen so that the full step change of real and reactive power should not cause noticeable change in the frequency and voltage.

TABLE II

PARAMETERS OF THE INVERTER-INFINITE BUS SYSTEM

| Parameters | Values | Parameters | Values |
|---|---|---|---|
| $L_s$ | 0.15 mH | $L_g$ | 0.0534 mH |
| $R_s$ | 0.045 Ω | $R_g$ | 0.06 Ω |
| C | 22 μF | Frequency | 50 Hz |
| R (parallel to C) | 1000 Ω | Voltage (line-line) | 17 Vrms |
| Rated power | 100 W | Initial grid phase | 0° |
| Inertia J | 0.01 Kgm² | K | 13580 |

IV. Simulation Results

The idea described above has been verified with simulations. The parameters of the inverter for carrying out then simulations are given in Table II.

The frequency drooping coefficient is chosen as $D_p=0.2432$ so that the frequency drops 0.5% when the torque (power) increases 100%. The virtual inertia is chosen as $J=0.01$ so that no-load time constant is roughly $\tau_f=0.04$ second. The simulation was carried out in MATLAB® 7.4 with Simulink™. The solver used in the simulations is ode23tb with a reactive tolerance $10^{-3}$ and a maximum step size of $10^{-4}$ second.

A. Grid-Connected Mode: Without Voltage Drooping

The inverter is connected to the grid via a circuit breaker and a step-up transformer. In this case, $D_q=0$. The SSG was connected to the grid at t=1 second. The real power P=80 W was applied at t=2 second by suitably setting $P_{set}$ and the reactive power Q=60 Var was applied at t=35 second by means of $Q_{set}$. In the simulations, a model of the LC filter and the interfacing inductor was included in the control algorithm so that it is possible to assume that the inverter was connected to the grid virtually inside the controller all the time (although the converter was not connected to the grid physically until t=1 second). The initial state of $\dot{\theta}$ was set at 100π. The drooping coefficient $D_p$ was reduced to 1% of its original value before any real power was applied and the inertia was reduced so that the no-load time constant WAS abut 2 cycles before the inverter was connected to the grid.

Figure 5:
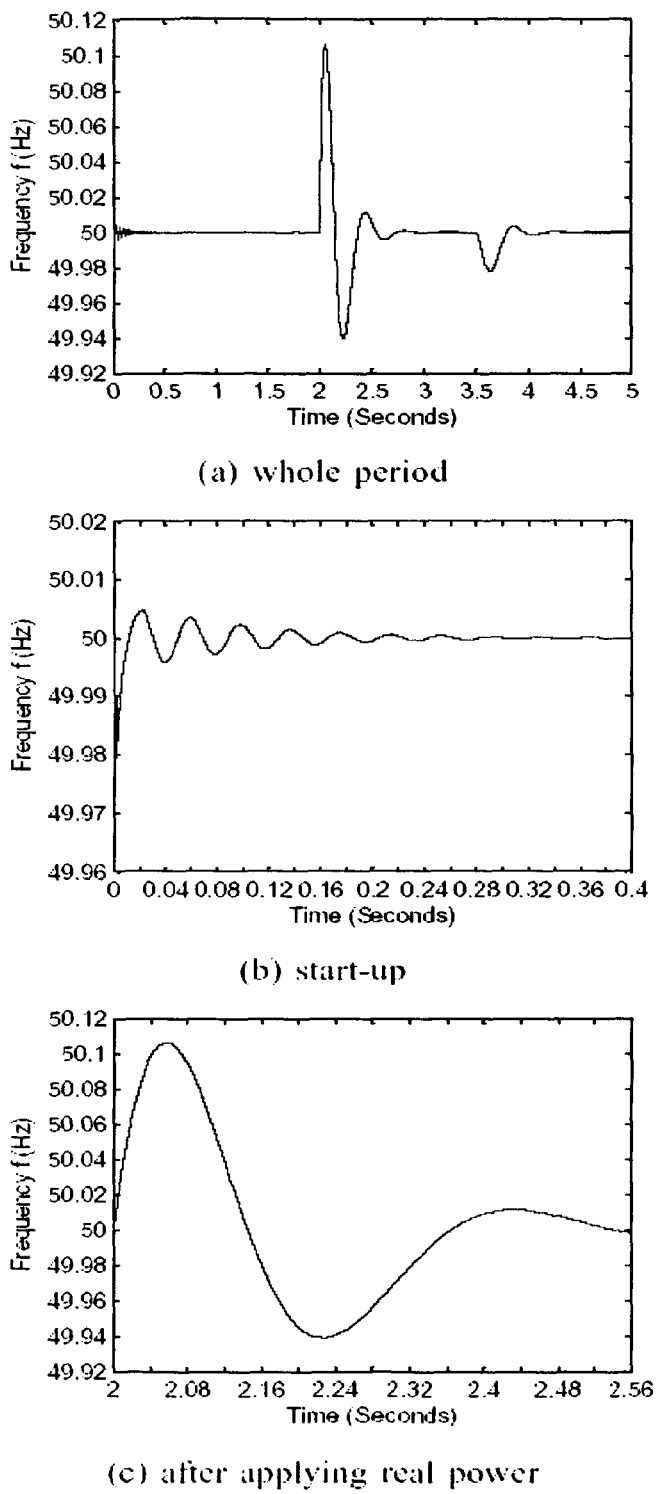

The response of the SSG frequency is shown in FIG. 5. The SSG quickly synchronised with the grid in about 10 cycles. No visible dynamics were seen after the SSG was connected to the grid at t=1 second. When the SSG was requested to deliver 80 W real power to the grid, the frequency of the SSG increased and then returned to the grid frequency 50 Hz after about 20 cycles. When the SSG was requested to deliver 60 Var reactive power to the grid, the frequency of the SSG decreased slightly and then returned to the grid frequency quickly.

Figure 6B:
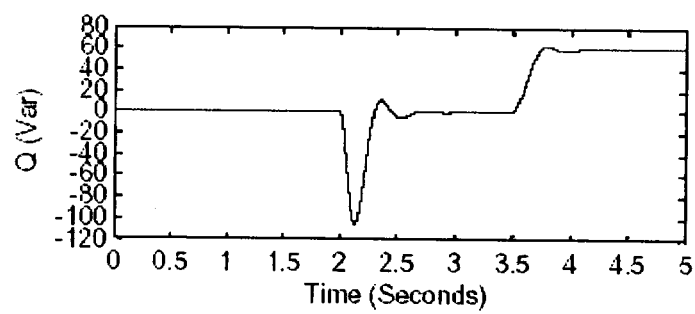

The output power of the SSG is shown in FIG. 6. During the synchronisation period, there were some oscillations in the power (which is inside the controller as the breaker is not yet turned on and hence it does not cause any problem). Before the SSG was requested to deliver power (i.e., before t=2 seconds), the real power and reactive power were zero. Then, the real power delivered to the grid gradually increased to the set point 80 W. During this transient process, the SSG initially took reactive power from the grid but returned to normal. A t=3.5 second, the reactive power delivered by the SSG increased to the setpoint 60 Var gradually. During this period, the real power increased slightly but then returned to the set point 80 W very quickly.

B. Island Mode: With Voltage Drooping

In this case, $P_{set}$ and $Q_{set}$ were set a 0 and $D_q=144.0876$ so that the voltage changes 5% if the reactive power changes 100%. The island mode is simulated by setting $R_g=10000Ω$ and $L_g=0$. The resistor R connected in parallel with C is reduced to 5Ω at t=2 second ad C is increased to 660 μF at t=3.5 second. The current i is not fed back to the system before t=0.1 second, i.e., before the voltage v is established.

The frequency curve is shown in FIG. 8(a). After the real power applied at t=2 second, the frequency reduced to 49.855 Hz, which further reduced to 49.842 Hz after the reactive load was applied. The real power and reactive power are shown in FIG. 8(b). The change of the bad caused some fast oscillations (spikes) in the curve. The amplitude of the terminal voltage is shown in FIG. 8(c). Although there were some fast oscillations (spikes) in the voltage when the load was changed, the voltage fell into the close range of the nominal value very quickly.

The invention claimed is:

1. A control device for an inverter, the control device implementing a model of a synchronous generator comprising:
   a computer processor;
   variables representing an angular position and rotational speed of a virtual generator rotor;
   logic for calculating a virtual electromagnetic torque acting on the virtual generator rotor from measured inverter output current and from a variable representing a virtual excitation current;
   logic for calculating the rotational speed of the virtual rotor from the virtual electromagnetic torque and from at least one variable representing a virtual drive torque applied to the virtual generator rotor, and from a parameter representing the rotor's virtual inertia; and
   logic for calculating, from the variables representing angular position and rotational speed of the virtual generator rotor and from the variable representing the excitation current, a control signal for controlling the inverter to produce an AC output which corresponds to that of the virtual synchronous generator,
   wherein the control device further comprising logic which implements a first feedback loop in which deviation of the rotational speed of the virtual generator rotor from a reference rotational speed is detected and used to adjust the virtual drive torque, thereby to regulate the angular speed of the virtual generator rotor, and hence to regulate frequency of the AC output from the inverter and the real power supplied by the inverter,
   wherein at least one of said logic for calculating is executed by said computer processor.

2. A control device as claimed in claim 1 further comprising logic implementing a second feedback loop in which deviation of a measured inverter output voltage from a reference value is detected and used in adjustment of the virtual excitation current, thereby to regulate the inverter output voltage.

3. A control device as claimed in claim 2 in which the deviation of reactive power from a reference level is detected and is used in adjustment of the virtual excitation current in the second feedback loop, thereby to regulate reactive power supplied by the inverter.

4. A control device as claimed in claim 1, in which the first feedback loop receives as an input a nominal virtual drive torque, this being added to a correction to the virtual drive torque provided through the feedback loop to form the virtual drive torque and added to the virtual electromagnetic torque to determine the total virtual torque acting upon the virtual generator rotor.

5. A control device as claimed in claim 4 in which the total virtual torque acting upon the virtual rotor is integrated and divided by a virtual rotor momentum to determine the rotational speed of the virtual generator rotor.

6. A control device as claimed in claim 5 in which the difference between the rotational speed of the virtual generator rotor and a reference rotational speed, corresponding to the desired AC output frequency of the inverter, is multiplied by a frequency drooping coefficient to form the correction to the virtual drive torque.

7. A control device as claimed in claim 4, in which the nominal virtual drive torque is determined by dividing an input representing desired inverter real output power by a value representing the angular speed of the AC inverter output.

8. A control device as claimed in claim 1, in which the virtual electromagnetic torque is calculated as the product of the measured inverter output current, the virtual excitation current, and a sin or cosine function of the angular position of the virtual generator rotor.

9. A control device as claimed in claim 1, in which the inverter is controlled to provide an alternating output voltage determined from the model of the synchronous generator.

10. A control device as claimed in claim 9 in which the alternating output voltage to be provided by the inverter is calculated as the product of the rotational speed of the virtual generator rotor, the virtual excitation current, and a sin or cosine function of the angular position of the virtual generator rotor.

11. A control device as claimed in claim 10 in which the control signal for controlling the inverter is pulse width modulated to cause the inverter to provide the calculated alternating output voltage.

12. A control device as claimed in claim 2, in which, in the second feedback bop, the difference between reactive power and its reference level is added to a voltage drooping variable representing the deviation of the measured inverter output voltage from its reference value and is integrated to establish the virtual excitation current.

13. A control device as claimed in claim 12 in which the voltage drooping variable is established by multiplying the deviation of the measured inverter output voltage from its reference value by a voltage drooping coefficient.

14. A control device as claimed in claim 13 in which the measured inverter output voltage is the amplitude of the inverter's AC output.

15. A control device as claimed in claim 1, wherein the control device is further configured for controlling an inverter which is to be connected to a power distribution grid, the control device comprising a device for detecting the AC frequency of the power distribution grid and using same to form the reference rotational speed used in the first feedback loop to control rotational speed of the virtual generator rotor.

16. A control device as claimed in claim 15 further comprising a device for detecting the AC phase of the power distribution grid, and for resetting the angular position of the virtual generator rotor to match the phase of the grid prior to connection of the inverter to the grid.

17. A control device as claimed in claim 16 in which the frequency and phase of the power distribution grid are obtained using a phase locked loop.

18. An apparatus for regulating supply of electrical power from a power source, the apparatus comprising a control device as claimed in any preceding claim operatively connected to an inverter, and the inverter having at least one output line connectable via a circuit breaker to a power supply grid.

19. An apparatus as claimed in claim 18 comprising LC smoothing circuitry connected between the inverter and the circuit breaker.

20. An apparatus as claimed in claim 18 comprising a coupling inductance in series between the inverter and the circuit breaker.

21. A method of controlling an inverter, comprising modelling of a synchronous generator by
representing the angular position and rotational speed of a virtual generator rotor using numerical variables;
measuring the inverter's output current;
calculating a virtual electromagnetic torque acting on the virtual generator rotor from measured inverter output current and from a variable representing a virtual excitation current;
calculating the rotational speed of the virtual rotor from the virtual electromagnetic torque and from at least one variable representing a virtual drive torque applied to the virtual generator rotor, and from a parameter representing the rotor's virtual inertia;
calculating, from the variables representing angular position and rotational speed of the virtual generator rotor and from the variable representing the excitation current, a control signal for controlling the inverter to produce an AC output which corresponds to that of the virtual synchronous generator; and
implementing a first feedback loop in which deviation of the rotational speed of the virtual generator rotor from a reference rotational speed is detected and used to adjust the virtual drive torque, thereby to regulate the rotational speed of the virtual generator rotor, and hence to regulate frequency of the AC output from the inverter and the real power supplied by the inverter,
wherein at least one of the steps of calculating is executed by a computer processor.

22. A method as claimed in claim 21 further comprising implementing a second feedback loop in which deviation of a measured inverter output voltage from a reference value is detected and used in adjustment of the virtual excitation current, thereby to regulate the inverter output voltage.

23. A method as claimed in claim 22 in which the deviation of reactive power from a reference level is detected and is used in adjustment of the virtual excitation current in the second feedback loop, thereby to regulate reactive power supplied by the inverter.

* * * * *